US011685675B2

(12) United States Patent
Calhoun (10) Patent No.: US 11,685,675 B2
(45) Date of Patent: *Jun. 27, 2023

(54) REDUCTION OF SUBSTANCES IN CONTAMINATED FLUIDS USING A NATURALLY OCCURRING BIOLOGICAL GROWTH MEDIA (71) Applicant: NUVODA LLC, Raleigh, NC (US)

(72) Inventor: Jason Calhoun, Riner, VA (US)

(73) Assignee: NUVODA LLC, Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/237,000

(22) Filed: Dec. 31, 2018

(65) Prior Publication Data

US 2019/0135666 A1 May 9, 2019

Related U.S. Application Data (63) Continuation of application No. 14/519,842, filed on Oct. 21, 2014, now Pat. No. 10,189,730.

(Continued)

(51) Int. Cl.
C02F 3/08 (2006.01)
C02F 3/34 (2006.01)
(Continued)

(52) U.S. Cl.
CPC ............ C02F 3/08 (2013.01); C02F 3/105 (2013.01); C02F 3/121 (2013.01); C02F 3/343 (2013.01);
(Continued)

(58) Field of Classification Search
CPC .... C02F 1/286; C02F 3/04; C02F 3/08; C02F 3/105; C02F 3/121; C02F 3/343;
(Continued)

(56) References Cited

U.S. PATENT DOCUMENTS 4,284,508 A 8/1981 Jewell
4,374,734 A * 2/1983 Newcombe .......... B01D 17/047
208/188

(Continued)

FOREIGN PATENT DOCUMENTS

CN 101553435 A 10/2009
CN 102858696 A 1/2013
(Continued)

OTHER PUBLICATIONS

Neff et al., "Produced Water: Overview of Composition, Fates, and Effects," 10.1007/978-1-4614-0046-2_1, Jul. 2011, accessed on the Internet at https://www.researchgate.net/publication/225911658_Produced_Water_Overview_of_Composition_Fates_and_Effects, on Apr. 13, 2021, 52 pages. (Year: 2011).*

(Continued)

Primary Examiner — Patrick Orme
(74) Attorney, Agent, or Firm — Seed IP Law Group LLP (57) ABSTRACT A treatment process for municipal, commercial, industrial, and institutional fluids containing one or more substances at a first concentration includes a contactor, an aerator, and a separator. The fluid is mixed with a powdered natural lignocellulosic material ("PNLM"), a microbial growth inoculum, and at least a portion of the fluid in the contactor to provide a mixture that includes an established, acclimated microbial growth in the fluid. The mixture is introduced to an aerator where physical binding and chemical bonding of at least some of the one or more substances to the PNLM additionally physiological uptake by microbial growth in a biosludge reduces the concentration of at least some of the one or more substances in the fluid discharged from the aerator to a second concentration. The biosludge is separated to recover at least a portion of the PNLM that is recycled to the contactor.

20 Claims, 3 Drawing Sheets

Related U.S. Application Data (60) Provisional application No. 61/894,232, filed on Oct. 22, 2013.

(51) Int. Cl.

| | | |
|---|---|---|
| C02F 3/12 | (2006.01) | |
| C02F 101/32 | (2006.01) | |
| C02F 1/28 | (2006.01) | |
| C02F 3/10 | (2023.01) | |
| C02F 103/22 | (2006.01) | |
| C02F 3/04 | (2023.01) | |
| C02F 103/00 | (2006.01) | |
| C02F 103/32 | (2006.01) | |

(52) U.S. Cl.
CPC ............ *C02F 1/286* (2013.01); *C02F 3/04* (2013.01); *C02F 2101/32* (2013.01); *C02F 2103/001* (2013.01); *C02F 2103/22* (2013.01); *C02F 2103/32* (2013.01); *C02F 2203/004* (2013.01); *C02F 2301/046* (2013.01); *Y02W 10/10* (2015.05)

(58) Field of Classification Search
CPC ............ C02F 2101/101; C02F 2101/16; C02F 2101/32; C02F 2101/345; C02F 2103/001; C02F 2103/22; C02F 2103/32; C02F 2203/004; C02F 2301/046; Y02W 10/10
See application file for complete search history.

(56) References Cited

U.S. PATENT DOCUMENTS

| | | | |
|---|---|---|---|
| 4,521,311 A | 6/1985 | Fuchs et al. | |
| 4,615,807 A | 10/1986 | Haines et al. | |
| 4,681,685 A | 7/1987 | Sutton et al. | |
| 4,735,725 A | 4/1988 | Reischl et al. | |
| 5,192,441 A | 3/1993 | Sibony et al. | |
| 5,536,410 A | 7/1996 | Kitatsuji et al. | |
| 5,626,755 A | 5/1997 | Keyser et al. | |
| 5,846,424 A | 12/1998 | Khudenko | |
| 6,787,035 B2 | 9/2004 | Wang | |
| 6,926,830 B2 | 8/2005 | Ho et al. | |
| 7,157,000 B2* | 1/2007 | Tiemeyer | C02F 3/12 210/609 |
| 7,481,934 B2* | 1/2009 | Skillicorn | C02F 3/121 210/608 |
| 7,537,926 B2 | 5/2009 | Maga et al. | |
| 7,569,147 B2 | 8/2009 | Curtis et al. | |
| 8,911,628 B2 | 12/2014 | Nyhuis | |
| 9,670,083 B2 | 6/2017 | Wett et al. | |
| 9,802,847 B2 | 10/2017 | Murthy et al. | |
| 10,112,856 B2 | 10/2018 | Bott et al. | |
| 10,138,148 B2 | 11/2018 | Boltz et al. | |
| 10,287,195 B2 | 5/2019 | Murthy et al. | |
| 10,464,832 B2 | 11/2019 | Murthy et al. | |
| 2004/0079692 A1 | 4/2004 | Cote et al. | |
| 2005/0082222 A1 | 4/2005 | Austin | |
| 2006/0243661 A1 | 11/2006 | You et al. | |
| 2006/0249451 A1 | 11/2006 | Tiemeyer | |
| 2007/0209999 A1* | 9/2007 | Smith | G01R 1/067 210/631 |
| 2009/0014387 A1 | 1/2009 | Probst | |
| 2011/0005284 A1 | 1/2011 | Conner et al. | |
| 2011/0146976 A1 | 6/2011 | Hackworth et al. | |
| 2011/0198284 A1 | 8/2011 | Nyhuis | |
| 2011/0203992 A1 | 8/2011 | Liu et al. | |
| 2011/0272350 A1 | 11/2011 | Skillicorn et al. | |
| 2011/0281321 A1 | 11/2011 | Skillicorn | |
| 2012/0043277 A1 | 2/2012 | Smith et al. | |
| 2013/0068688 A1 | 3/2013 | Ager et al. | |
| 2013/0233792 A1 | 9/2013 | Brown, III | |
| 2013/0233794 A1 | 9/2013 | Brown | |
| 2013/0319940 A1 | 12/2013 | Josse et al. | |
| 2014/0008280 A1 | 1/2014 | Husain et al. | |
| 2014/0014586 A1* | 1/2014 | Soane | C02F 1/683 210/666 |
| 2014/0144836 A1 | 5/2014 | Nyhuis et al. | |
| 2015/0336827 A1 | 11/2015 | Boltz et al. | |
| 2019/0055147 A1 | 2/2019 | Boltz et al. | |
| 2019/0263696 A1 | 8/2019 | Bott et al. | |

FOREIGN PATENT DOCUMENTS

| | | |
|---|---|---|
| DE | 41 30 424 A1 | 3/1993 |
| DE | 299 23 300 U1 | 9/2000 |
| EP | 2 163 524 A1 | 3/2010 |
| EP | 2 366 673 A1 | 9/2011 |
| JP | 54-28453 A | 3/1979 |
| JP | 54-81665 A | 6/1979 |
| JP | 60-12193 A | 1/1985 |
| JP | 60-122095 A | 6/1985 |
| JP | 62-57661 A | 3/1987 |
| JP | 5-261393 A | 10/1993 |
| JP | 6-7789 A | 1/1994 |
| JP | 7-163995 A | 6/1995 |
| JP | 8-117777 A | 5/1996 |
| JP | 8-224588 A | 9/1996 |
| JP | 10-202280 A | 8/1998 |
| JP | 10-249376 A | 9/1998 |
| JP | 10-263580 A | 10/1998 |
| JP | 11-156385 A | 6/1999 |
| JP | 11-319868 A | 11/1999 |
| JP | 2002-86175 A | 3/2002 |
| JP | 2004-33807 A | 2/2004 |
| JP | 2004-337785 A | 12/2004 |
| JP | 2005-152878 A | 6/2005 |
| JP | 2008-23498 A | 2/2008 |
| JP | 2010-188268 A | 9/2010 |
| JP | 2012-532748 A | 12/2012 |
| JP | 2013-39538 A | 2/2013 |
| JP | 2016-525100 A | 8/2016 |
| JP | 2016-533874 A | 11/2016 |
| JP | 2017-521234 A | 8/2017 |
| WO | 02/079103 A2 | 10/2002 |
| WO | 2013/049046 A1 | 4/2013 |
| WO | 2014/012817 A1 | 1/2014 |

OTHER PUBLICATIONS

Merriam-Webster Dictionary, Definition of "acclimate," accessed on the Internet at https://www.merriam-webster.com/dictionary/acclimate on Jul. 26, 2021, 1 page. (Year: 2021).*
Australian Examination Report No. 2, dated Jul. 25, 2017, for Australian Application No. 2014340220, 3 pages.
Australian Examination Report, dated Feb. 15, 2017, for Australian Application No. 2014340220, 3 pages.
Australian Examination Report, dated Feb. 8, 2018, for Australian Application No. 2015264014, 4 pages.
Boltz et al., "Biofilm Media, Treatment System and Method of Treatment," U.S. Appl. No. 62/001,241, filed May 21, 2014, 51 pages.
Chinese Office Action, dated Dec. 3, 2018, for Chinese Application No. 201580036304.6, 15 pages. (with English Translation).
Chinese Office Action, dated Jun. 23, 2017, for Chinese Application No. 201480070145.7, 19 pages. (with English Translation).
Chinese Office Action, dated Mar. 22, 2018, for Chinese Application No. 201480070145.7, 8 pages. (with English Translation).
Chinese Office Action, dated Oct. 12, 2018, for Chinese Application No. 201480070145.7, 7 pages. (with English Translation).
Extended European Search Report, dated Jan. 2, 2018, for European Application No. 15796397,6-1371, 7 pages.
Extended European Search Report, dated May 4, 2017, for European Application No. 14854935.5-1371, 8 pages.
Final Office Action, dated Nov. 1, 2017, for U.S. Appl. No. 14/719,233, Boltz et al., "Biofilm Media, Treatment System and Method of Wastewater Treatment," 12 pages.
International Search Report and Written Opinion, dated Jan. 29, 2015, for International Application No. PCT/US2014/061607, 11 pages.

(56) References Cited

OTHER PUBLICATIONS

International Search Report and Written Opinion, dated Oct. 6, 2015, for International Application No. PCT/US2015/032057, 11 pages.
Japanese Office Action, dated May 8, 2018, for Japanese Application No. 2016-525100, 10 pages. (with English Translation).
Notice of Allowance, dated Jul. 6, 2018, for U.S. Appl. No. 14/719,233, Boltz et al., "Biofilm Media, Treatment System and Method of Wastewater Treatment," 10 pages.
Notice of Allowance, dated Nov. 19, 2018, for U.S. Appl. No. 14/519,842, Calhoun, "Reduction of Substances in Contaminated Fluids Using a Naturally Occurring Biological Growth Media," 8 pages.
Notice of Allowance, dated Sep. 13, 2018, for U.S. Appl. No. 14/519,842, Calhoun, "Reduction of Substances in Contaminated Fluids Using a Naturally Occurring Biological Growth Media," 15 pages.
Office Action, dated Apr. 27, 2017, for U.S. Appl. No. 14/719,233, Boltz et al., "Biofilm Media, Treatment System and Method of Wastewater Treatment," 15 pages.
Office Action, dated Jun. 2, 2017, for U.S. Appl. No. 14/519,842, Calhoun, "Reduction of Substances in Contaminated Fluids Using a Naturally Occurring Biological Growth Media," 26 pages.
Office Action, dated Nov. 28, 2017, for U.S. Appl. No. 14/519,842, Calhoun, "Reduction of Substances in Contaminated Fluids Using a Naturally Occurring Biological Growth Media," 34 pages.
Japanese Office Action, dated Feb. 1, 2019, for Japanese Application No. 2016-568813, 9 pages (with machine generated English translation),.
Japanese Office Action, dated Feb. 12, 2020, for Japanese Application No. 2019-060791, 12 pages. (with English translation).
Mexican Office action dated Feb. 4, 2020, for Mexican Application No. MX/a/2016/005184, 6 pages. (with partial English translation).
Japanese Notification of Reasons for Refusal dated Nov. 4, 2020, for Japanese Application No. 2019-060791, 16 pages. (With English Translation).
Office Action, dated May 12, 2021, for U.S. Appl. No. 16/165,617, Boltz et al., "Biofilm Media, Treatment System and Method of Wastewater Treatment," 32 pages.
Brazilian Technical Examination Report, dated Nov. 3, 2021, for the corresponding Brazilian Patent Application No. BR112016009051-9, (11 pages). (with English translation).
Brazilian Technical Examination Report dated Jun. 22, 2021, for the corresponding Brazilian Patent Application No. BR112016027241-2, (9 pages). (with English translation).
Canadian Office Action dated Mar. 26, 2021, for the corresponding Canadian Patent Application No. 2,928,365, (6 pages).
Canadian Office Action, dated Oct. 18, 2021, for the corresponding Canadian Patent Application No. 2,928,365. (7 pages).
Chinese Office Action, dated Oct. 15, 2021, for the corresponding Chinese Application No. 202010126407.4. (13 pages). (with English translation).
Extended European Search Report, dated Jul. 12, 2021, for the corresponding European Application No. 21167152.4-1101. (6 pages).
Examination Report for IN application No. 201617014535, dated May 31, 2019, 6 pages.
Memo Concerning The Official Action Reported In The Covering Letter for MX application No. MX/a/2016/005184, 2 pages.
Extended European Search Report, dated Apr. 1, 2019, for European Application No. 19155973.1-1101, 8 pages.
Examination Report dated Aug. 13, 2021, for the corresponding New Zealand Application No. 758065, 3 pages.
Examination Report dated Sep. 27, 2021, for the corresponding New Zealand Application No. 719220, 3 pages.
Brazilian Technical Examination Report, dated Apr. 4, 2022, for Brazilian Patent Application No. BR 11 2016 009051-9, 8 pages. (with English translation).
Canadian Office Action, dated May 4, 2022, for Canadian Patent Application No. 2,928,365, 6 pages.
Chinese Office Action, dated May 9, 2022, for Chinese Patent Application No. 202010126407.4, 11 pages. (with English translation).
"Activated sludge," Wikipedia, archived Sep. 16, 2021, URL=https://en.wikipedia.org/wiki/Activated_sludge, download date Sep. 16, 2021. (1 page).
Korean Office Action, dated Nov. 22, 2021, for Korean Application No. 10-2016-7035539. (with English translation). (21 pages).
Ministry of Environment, "Sewage facility standards," Korea Water and Sewage Association, 2011. (with English translation). (23 pages).
Final Office Action, dated Mar. 1, 2022, for U.S. Appl. No. 16/165,617, Boltz et al., "Biofilm Media, Treatment System and Method of Wastewater Treatment," 22 pages.
Extended European Search Report, dated Jul. 12, 2021, for European Application No. 21167152.4-1101, 6 pages.
Office Action, dated May 12, 2021, for U.S. Appl. No. 16/165,617, Boutz et al., "Biofilm Media, Treatment System and Method of Wastewater Treatment," 32 pages.
Korean Office Action, dated Aug. 30, 2022, for Korean Patent Application No. 10-2016-7035539, 6 pages. (with English translation).
Brazil Office Action, for Brazilian Application No. BR112016027241-2, dated Nov. 1, 2019, 8 pages (with English Translation).
Chinese Office Action, dated Oct. 25, 2022, for Chinese Patent Application No. 202010126407.4, (8 pages). (with English translation).
Brazilian Office Action, dated Sep. 18, 2022, for Brazilian Patent Application No. 12 2022 002281-2. (7 pages). (with English translation).

\* cited by examiner

REDUCTION OF SUBSTANCES IN CONTAMINATED FLUIDS USING A NATURALLY OCCURRING BIOLOGICAL GROWTH MEDIA

BACKGROUND

Technical Field

This disclosure generally relates to microbiological treatment of fluids containing one or more contaminants, more particularly to microbiological treatment systems and methods using powdered natural lignocellulosic materials ("PNLMs").

Description of the Related Art

Biological treatment systems are found throughout the municipal, industrial, and commercial water treatment fields. A biological treatment system, maintains conditions favorable for microbial development (e.g., pH, dissolved oxygen, nutrients, and temperature) such that the biological organisms present in the system convert at least a portion of the contaminants or other substances present in the water to biological growth (i.e., increase in biomass) and to one or more preferred byproducts such as water, carbon dioxide, and methane. Traditionally, biological treatment systems treated potable water waste such as sewage collected from residential, institutional, commercial, and industrial establishments. At times, the biological treatment system may receive additional waste from industry and commerce. At other times, the biological treatment system may also receive a quantity of storm water runoff particularly in industrial and commercial settings. Given the disparate nature of the sources generating the wastewater, biological treatment facilities may receive any combination of sewage waste, dirt, debris, oil, and grease.

To accommodate variable wastewater conditions, biological treatment systems generally comprise three stages, often referred to as primary treatment, secondary treatment, and tertiary treatment. Incoming wastewater passes through a number of screens, filters, or sieves to remove large and/or dense debris (e.g., sand, rocks, rags, sticks, plastic bags, and other "trash"). The screened wastewater flows to the primary treatment stage. The primary treatment stage frequently involves the use of quiescent settling ponds or basins to receive the incoming wastewater. The heavier solids present in the wastewater tend to sink in the settling basin and are removed using drags, scrapers, or similar equipment. Lighter materials such as oil and grease and buoyant solids tend to float in the settling basin and are removed using skimmers or similar equipment. In at least some instances, one or more flocculating agents may be introduced to the settling basins to promote the formation of denser, more easily settled solids. In at least some instances, dissolved air may be introduced to the settling basins to promote the formation of more easily skimmed foam or froth containing at least a portion of the oils and greases present in the wastewater. Clarified water, now free of the heavier and lighter solids removed in the settling basin flows from the primary treatment stage to the secondary treatment stage.

Secondary treatment degrades the sewage derived from human waste, food waste, soaps, detergents, animal processing, organic and inorganic fertilizer runoff, and the like. The secondary treatment stage may also include one or more substance-specific microbiological organisms used to degrade contaminants found in the wastewater, for example hydrocarbons that may be present in wastewater generated during hydrocarbon processing operations or street/parking lot runoff. The secondary treatment process typically involves the use of an aerobic biological process in which bacteria and protozoa in an aerator consume biodegradable soluble organic contaminants such as sugars, fats, organic short-chain carbon molecules, and the like and bind other less soluble fractions into a flocculated mass.

Secondary treatment systems can include fixed-film or attached-growth systems in which microbial growth occurs on a surface that is in continuous or intermittent contact with the wastewater. Typical examples include trickling filters, biotowers, and rotating biological contactors. Secondary treatment systems may include activated sludge treatment systems that force an oxygen containing gas through the aerator to promote the growth of biological floc to remove organic materials from the wastewater. Other forms of secondary treatment include aerobic granular sludge, surface-aerated basins, filter beds, constructed wetlands, biological aerated filters, rotating biological contactors, and membrane reactors.

The sludge formed in the secondary treatment system is clarified and settled in a separator such as a clarifier-settler. In some instances, a portion of the sludge may be recycled to the facility influent to consistently maintain a microbial population acclimated to the particular constituents, contaminants, or substances present in the incoming wastewater. At least a portion of the settled sludge may be further processed to remove additional water, for example via one or more centrifugal separators or filters prior to disposal.

BRIEF SUMMARY

Wastes generated by the municipal, industrial, commercial, and institutional sectors typically include a fluid such as water carrying one or more suspended substances and/or one or more dissolved substances. These substances may include carbon containing substances such as sewage and hydrocarbons that are biodegradable by one or more microbial organisms. The substances may include inorganic compounds such as nitrogen and phosphorus containing compounds that may be converted in form by one or more microbial organisms (e.g., nitrates may be converted to nitrogen gas) and/or assimilated into the structure of one or more microbial organisms (e.g., phosphorus may be stored within the cellular structure of certain microbial organisms). All biological treatment systems rely upon contacting the fluid containing the one or more substances with the microbial organisms in an environment where the microbial organisms are able to degrade or otherwise assimilate the substances.

One established method for contacting the fluid with microbial organisms is by passing the fluid across a fixed film that includes an established microbial growth. Such fixed film treatment systems frequently employ plastic or other non-biodegradable biological support media that may degrade with time and may require periodic, costly, clean-up and/or replacement. Newer developments in treatment include the use of suspended growth systems where the microbial organisms are dispersed throughout the fluid using mechanical and/or air agitation.

Activated sludge systems can be operated at high biosludge recycle ratios to achieve high biomass concentrations within the reactor while minimizing the formation of biosludge. Such high recycle ratios however tend to increase the sludge age within the clarifier. Increasing the sludge age in the clarifier can result in the accumulation of organisms such as filamentous bacteria, as well as the accumulation of biologically inhibitory compounds, both of which may hinder the ability to settle sludge in the clarifier.

Advanced fixed-film reactor designs such as fluidized or packed sludge bed systems have demonstrated efficiency and stability, particularly where a high degree of degradation is desired. One important component of such fixed-film systems is the media used to establish microbial growth. The media should have a large amount of surface area that allows for the attachment and growth of microorganisms. Additionally, the media should be inexpensive and robust. Powdered natural lignocellulosic materials ("PNLMs"), such as powdered kenaf, can provide such a support media. When added to a suspended growth treatment process, the PNLM acts as both an adsorbent as well as a biological growth media supporting the development of a robust biofilm that includes a significant number of beneficial microbial organisms.

The use of PNLMs as a support media can improve settling and biomass retention within the treatment process thereby improving the ability to recycle biosludge, increasing biosludge age, and reducing overall biosludge production. The supportive nature of PNLMs as well as the ability for PNLMs to adsorb substances carried by the fluid, tends to moderate shock loading to the clarifier and reduces the likelihood of upsets in the treatment process. Unlike non-biodegradable support films, PNLMs are biodegradable and may be efficiently disposed of after its useful life.

An illustrative biological treatment system includes a contactor in which a fluid that includes one or more substances at a first concentration is blended with a PNLM biological growth media such as powdered kenaf and an inoculum of biosludge containing established, acclimated, microbial organisms on the PNLM biological growth media. Conditions in the contactor are maintained such that the established, acclimated microbial organisms form a biofilm on at least a portion of the added PNLM biological growth media.

An aerator receives the acclimated microbial growth exhausted on an intermittent, periodic, or continuous basis from the contactor. In some instances, the aerator may receive additional fluid that includes the one or more substances at the first concentration. An oxygen containing gas such as air is added to the aerator via one or more distributors or similar. Conditions in the aerator favor the development of additional microbial organisms in the form of a suspended biosludge that accumulates in the lower portion of the aerator. The PNLM biological growth media present in the contactor and aerator absorbs at least some of the one or more substances in the fluid. The microbial growth carried by the PNLM biological growth media also degrades or consumes at least some of the one or more substances in the fluid. The fluid, now with at least some of the one or more substances reduced to a second concentration, accumulates in an upper portion of the aerator. At least a portion of the fluid that includes the one or more substances at the second concentration exits the aerator.

At least a portion of the biosludge in the aerator is recycled to the contactor to provide the inoculum of biosludge containing established, acclimated, microbial organisms on the PNLM biological growth media. At least some of the remaining portion of the biosludge in the aerator is exhausted to a separator. The separator separates at least a portion of the PNLM biological growth media from the biosludge. At least a portion of the separated PNLM biological growth media is recycled to the contactor. The microbial biomass separated from the PNLM biological growth media exits the separator.

A system to treat a fluid including one or more substances at a first concentration may be summarized as including: (a) a contactor including: (i) at least one inlet connection to receive a first portion of the fluid including the one or more substances at the first concentration; (ii) at least one inlet connection to receive a biological growth media including at least one powdered natural lignocellulosic material ("PNLM"); (iii) at least one inlet connection to receive a biological sludge ("biosludge") that includes a microbial growth; and (iv) at least one outlet connection to exhaust a mixture that includes the fluid, the biological growth media, and the microbial growth; (b) an aerator including: (i) at least one inlet connection to receive a remaining portion of the fluid containing the one or more substances at the first concentration; (ii) at least one inlet connection fluidly coupled to the at least one contactor outlet connection, the at least one inlet connection to receive some or all of the mixture; (iii) at least one inlet connection to receive an oxygen containing gas; (iv) at least one gas dispersion system to disperse the oxygen containing gas into the mixture to aerobically stimulate the formation of biosludge that includes at least the microbial growth and the biological growth media through the physiological consumption of at least a portion of the one or more substances by at least a portion of the microbial growth; (v) at least one outlet connection to exhaust the fluid including some or all of the one or more substances at a second concentration, the second concentration being less than the first concentration; and (vi) at least one outlet connection to exhaust a first portion of the biosludge to the contactor; and (c) a separator to apportion a remaining portion of the biosludge into a separated biological growth media component comprising at least about 60 wt % biological growth media and a biological component, the separator including: (i) at least one inlet connection fluidly coupled to the least one aerator outlet connection to receive the remaining portion of biosludge exhausted by the aerator; (ii) at least one liquid/solid separations stage to apportion the biosludge into a fluid-rich portion from and a biosludge-rich portion; (iii) at least one solid/solid separations stage to apportion at least some of the biosludge-rich portion into the separated biological growth media component and the biological component; (iv) at least one discharge connection to exhaust the portion of the fluid-rich portion; (v) at least one discharge connection to exhaust the biological component; and (vi) at least one discharge connection to exhaust at least a portion of the separated biological growth media component to the contactor.

The PNLM may include a powdered kenaf. The fluid may include water and the one or more substances may include one or more hydrocarbons. The one or more hydrocarbons may include one or more of: a benzene compound, a toluene compound, an ethylbenzene compound, a xylene compound, and a phenolic compound. The first concentration may be in excess of about 400 parts per million by weight. The second concentration may be less than 20 parts per million by weight. The one or more substances may further include one or more of: ammonia and hydrogen sulfide. The first concentration may be in excess of about 20 parts per million by weight. The second concentration may be less than 5 parts per million by weight. The fluid may include water and the one or more substances may include one or more quaternary amine compounds. The liquid/solid separation stage may include at least one of: a gravity settling basin, a centrifugal separator, or a filter. The solid/solid separations stage may include at least one of: one or more centrifuges, one or more hydrocyclones, and one or more drum separators. The contactor may further include at least one surface solids removal system. The contactor may further include at least one bottom solids removal system. The contactor may include an aerobic contactor in which the fluid, the biological growth media, and the microbial growth are maintained under aerobic conditions.

A method of reducing the concentration of one or more substances present in a fluid from a first concentration to a second concentration that is lower than the first concentration may be summarized as including acclimating a microbial growth to an environment including a fluid containing one or more substances at a first concentration in a contactor to provide an acclimated microbial growth; introducing at least a portion of the acclimated microbial growth, the fluid containing one or more substances at the first concentration and a biological support media including one or more powdered natural lignocellulosic materials ("PNLM") to an aerator; maintaining in the aerator a biological support media concentration of from about 1 milligram of biological support media per liter of fluid (mg/l) to about 5,000 mg/l; maintaining in the aerator a dissolved oxygen concentration of from about 0.1 milligrams of oxygen per liter of fluid (mg/l) to about 5 mg/l by dispersing an oxygen containing gas into the fluid; promoting the formation of a biological sludge that includes the microbial growth and the biological growth media in the aerator; reducing the concentration of the one or more substances in the fluid from the first concentration to the second concentration through the physiological consumption of at least a portion of the one or more substances present in the fluid by at least a portion of the microbial growth; discharging from the aerator the fluid containing some or all of the substances at the second concentration; and removing a first portion of biological sludge from the aerator; introducing the first portion of biological sludge from the aerator to the contactor to provide at least a portion of the biological component that includes at least a portion of the microbial growth; removing a remaining portion of biological sludge from the aerator; separating the remaining portion of biological sludge into at least a biological component comprising the microbial growth and a PNLM component comprising at least about 50% by weight separated PNLM in a separator; and introducing at least a portion of the separated PNLM component to the contactor to provide at least a portion of the at least one PNLM.

Acclimating a microbial growth to an environment including a fluid containing one or more substances at a first concentration in a contactor may include combining under aerobic conditions at least a portion of the fluid containing the one or more substances at the first concentration with a biological support media that includes one or more powdered natural lignocellulosic materials ("PNLM") and a biological component that includes at least a portion of the microbial growth. Combining at least a portion of the fluid containing the one or more substances at the first concentration with a biological support media that includes one or more powdered natural lignocellulosic materials ("PNLM") may include combining at least a portion of the fluid containing the one or more substances at the first concentration with a biological support media that includes one or more PNLM including kenaf. Acclimating a microbial growth to an environment including a fluid containing one or more substances at a first concentration may include acclimating a microbial growth to an environment including a fluid comprising water containing one or more substances comprising one or more hydrocarbons at a first concentration at or above about 500 parts per million by weight (ppm). Acclimating a microbial growth to an environment including a fluid comprising water containing one or more substances comprising one or more hydrocarbons may include acclimating a microbial growth to an environment including a fluid comprising water containing one or more substances comprising one or more hydrocarbons including at least one of: a benzene compound, a toluene compound, an ethylbenzene compound, or a xylene compound. Reducing the concentration of the one or more substances in the fluid from the first concentration to the second concentration may include reducing the concentration of the one or more substances in the fluid from the first concentration to the second concentration at or below 20 parts per million by weight (ppm). Acclimating a microbial growth to an environment including a fluid containing one or more substances at a first concentration may include acclimating a microbial growth to an environment including a fluid comprising water containing one or more substances comprising at least one of an ammonia compound or a hydrogen sulfide compound at a first concentration at or above about 20 parts per million by weight (ppm). Reducing the concentration of the one or more substances in the fluid from the first concentration to the second concentration may include reducing the concentration of the one or more substances in the fluid from the first concentration to the second concentration at or below 2 parts per million by weight (ppm). Acclimating a microbial growth to an environment including a fluid containing one or more substances at a first concentration may include acclimating a microbial growth to an environment including a fluid comprising water containing one or more substances comprising a quaternary amine at a first concentration at or above about 50 parts per million by weight (ppm). Reducing the concentration of the one or more substances in the fluid from the first concentration to the second concentration may include reducing the concentration of the one or more substances in the fluid from the first concentration to the second concentration at or below 2 parts per million by weight (ppm).

A separator to separate a biosludge including a powdered natural lignocellulosic material ("PNLM") and a biomass into a separated PNLM component comprising at least 50 weight percent (wt %) PNLM and a biological component may be summarized as including at least one inlet connection to receive a biosludge carried by a fluid; at least one liquid/solid separations stage to apportion the biosludge into a fluid-rich portion and a biosolids-rich portion; at least one solid/solid separations stage to apportion the biosolids-rich portion into the biological component and the PNLM component; at least one discharge connection to exhaust the fluid-rich portion; at least one discharge connection to exhaust the biological component separated from the biosludge; and at least one discharge connection to exhaust the PNLM component as mixture comprising at least about 50 wt % PNLM.

The PNLM may include powdered kenaf. The liquid/solid separations stage may include at least one of: a gravity settling basin, a centrifugal separator, or a filter. The solid/solid separations stage may include at least one of: one or more centrifuges, one or more hydrocyclones, and one or more drum separators.

The separator to separate a biosludge including a powdered natural lignocellulosic material ("PNLM") and a biomass into a separated PNLM component comprising at least 50 weight percent (wt %) PNLM and a biological component may further include at least one aerator that supports microbial growth via the PNLM to provide at least a portion of the biosludge that includes the PNLM component and the biological component, the aerator including: at least one inlet connection to receive at least a portion of a fluid including one or more substances at a first concentration; at least one inlet connection to receive PNLM, at least a portion of the PNLM including an established biological component comprising a microbial growth of one or more organisms; at least one inlet connection to receive an oxygen containing gas; at least one gas distribution assembly to distribute the oxygen containing gas received at the at least one aerator third inlet connection to disperse the oxygen containing gas into the fluid to aerobically stimulate microbial growth through the physiological consumption by at least a portion of the microbial growth of at least a portion of the one or more substances carried by the fluid; at least one outlet connection to exhaust the fluid including some or all of the one or more substances at a second concentration, the second concentration being less than the first concentration; and at least one outlet connection fluidly coupled to the at least one separator fluid inlet connection, the at least one second outlet connection to exhaust the biosludge carried by the fluid, the biosludge comprising the biological component and the PNLM component.

The separator to separate a biosludge including a powdered natural lignocellulosic material ("PNLM") and a biomass into a separated PNLM component comprising at least 50 weight percent (wt %) PNLM and a biological component may further include at least one contactor to provide to the aerator all or a portion of the PNLM including the established biological component comprising the microbial growth of the one or more organisms, the contactor including: at least one inlet connection to receive at least a portion of the fluid including one or more substances at a first concentration; at least one inlet connection to receive PNLM; at least one inlet connection to receive at least a portion of the biosludge comprising the biological component and the PNLM component carried by the fluid from the at least one aerator fluid outlet connection; and at least one outlet connection fluidly coupled to the at least one aerator inlet, the at least one outlet to exhaust the PNLM, at least a portion of which includes the established biological component comprising the microbial growth of one or more organisms.

The fluid may include water and the one or more substances may include one or more hydrocarbons. The one or more hydrocarbons may include one or more of: benzene compounds, toluene compounds, ethylbenzene compounds, xylene compounds, and phenolic compounds. The one or more substances may further include one or more of: ammonia and hydrogen sulfide. The fluid may include water and the one or more substances may include one or more quaternary amine compounds.

BRIEF DESCRIPTION OF THE SEVERAL VIEWS OF THE DRAWINGS

In the drawings, identical reference numbers identify similar elements or acts. The sizes and relative states of elements in the drawings are not necessarily drawn to scale. For example, the positions of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with biological treatment systems such as aeration basins, trickling filters, air blowers, pumps, filters, strainers, instrumentation, and controls have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Figure 1:
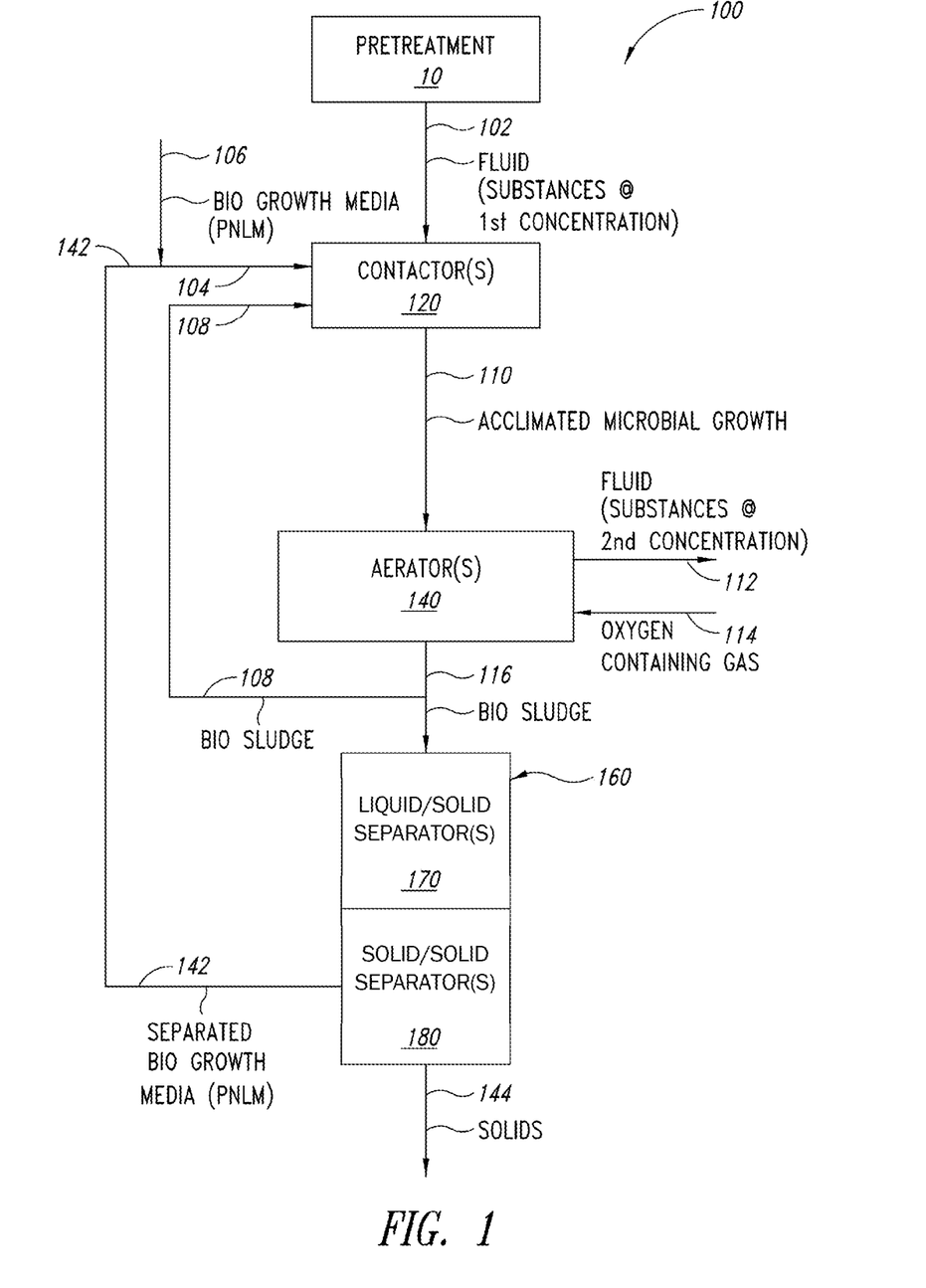
FIG. 1 is a block diagram of an illustrative treatment system for reducing the concentration of one or more substances in a fluid using a powdered natural lignocellulosic material (PNLM) that enhances the treatment process and which is separated from a biosludge and recycled back to the treatment process, according to one non-limiting illustrated embodiment.

FIG. 1 shows an example treatment system 100 for a fluid 102 containing one or more substances, according to one or more embodiments. The treatment system 100 includes an optional pretreatment stage 10 that removes at least a portion of the solid and/or particulate matter present in the fluid 102. The fluid 102, which includes one or more substances at a first concentration, flows from the pretreatment stage 10 to one or more contactors 120. In the one or more contactors 120, a biological growth media 104 that includes at least one powdered natural lignocellulosic material ("PNLM") 106 and recycled biosludge 108 disperses in the fluid 102. In the one or more contactors 120, the nutrients and/or substances present in the fluid 102 and the biological organisms recycled with the biosludge 108 promote microbial growth on the biological growth media 104. In at least some instances, the biological growth media 104 can include one or more powdered natural lignocellulosic materials (PNLMs). The one or more contactors 120 provide the biological organisms with an opportunity to acclimate gradually to changes in composition and/or changes in the first concentration of one or more substances present in the fluid 102. The one or more contactors 120 also provide surge and/or upset equalization capacity to minimize or otherwise mitigate the effects of sudden changes in flow or sudden changes in the first concentration of the substances present in the fluid 102 from upsetting and/or adversely affecting the biomass downstream of the one or more contactors 120.

Fluid containing the acclimated microbial growth 110 exits the one or more contactors 120 and enters one or more aerators 140. In the one or more aerators 140, the fluid and acclimated microbial growth 110 disperse in an environment containing additional, established, microbial growth (i.e., sludge or biosludge), biological growth media, and dissolved oxygen at levels sufficient to sustain aerobic microbial activity. An oxygen containing gas 114, such as air, supplied to the one or more aerators 140 provides dissolved oxygen at levels sufficient to at least meet microbial metabolic oxygen requirements. Within the one or more aerators 140, conditions favor or otherwise stimulate microbial growth and reproduction, through the physiological consumption of at least a portion of the one or more substances present in the fluid along with other nutrients. The biological growth media 106 added to the aerator 140 supports additional biosludge growth and development (e.g., a "biofilm") both physically (e.g., by providing very large quantities of surface area per unit volume) and physiologically (e.g., by degrading slowly over time and releasing starches and sugars into the fluid). The consumption of at least a portion of the substances carried by the fluid into the aerator 140 is reduced over time through the biological and chemical degradation occurring in the aerator 140. Thus, at least some of the one or more substances in the fluid 112 exiting the aerator are at a second concentration that is lower than the first.

For example, the incoming fluid 102 may be sourced at least in part from a chemical process or runoff stream containing one or more substances such as soluble hydrocarbons at a first concentration. At least some of the soluble hydrocarbons may physically or chemically bond to the biological growth material, reducing the concentration of such hydrocarbons in the fluid. An additional quantity of the soluble hydrocarbons are physiologically consumed by the microbial population carried by the biological growth media 106, such as known hydrocarbon degrading bacteria from the genera *Alcanivorax, Marinobacter, Pseudomonas*, and *Acinetobacter*. Thus, the fluid 112 exiting the aerator 140 includes at least some of the one or more substances (i.e., soluble hydrocarbons) at a second concentration that is lower than the first concentration.

In another example, the incoming fluid 102 may be sourced at least in part from one or more sources of nitrogenous wastes such as food processing or fertilizer runoff containing one or more substances such as ammonia, nitrate, and nitrites at a first concentration. Typically such nitrogenous wastes would be converted to nitrogen using a nitrification/denitrification process using bacteria such as *Nitrosomonas* to convert the ammonia to nitrite and *Nitrobacter* to convert the nitrite to nitrate. Bacteria such as *Pseudomonas* and *Clostridium* convert the nitrate to elemental nitrogen under anaerobic or anoxic conditions. At least some of the nitrogenous wastes may physically or chemically bond to the biological growth material 106, reducing the concentration of such wastes in the fluid. Thus, the fluid 112 exiting the aerator 140 includes at least some of the one or more substances (i.e., nitrogenous wastes) at a second concentration that is lower than the first concentration.

In another example, the incoming fluid 102 may be sourced at least in part from one or more sources of waste such as fertilizer runoff containing one or more phosphorus compounds such as phosphates at a first concentration. Typically such phosphorus containing wastes would be accumulated as polyphosphates within the cellular structure of heterotrophic bacteria, called polyphosphate-accumulating organisms ("PAO") under anaerobic conditions. At least some of the phosphorus compounds may physically or chemically bond to the biological growth material 106, reducing the concentration of such wastes in the fluid. Thus, the fluid 112 exiting the aerator 140 includes at least some of the one or more substances (i.e., phosphorus compounds) at a second concentration that is lower than the first concentration.

In another example, the incoming fluid 102 may be sourced at least in part from one or more sources of waste that present a high biochemical oxygen demand ("BOD"), such as sources of organic matter, dead leaves, manure, sewage, food waste, etc. The incoming fluid may be sourced at least in part from one or more sources that present a high chemical oxygen demand ("COD"), such as sources of one or more inorganic wastes (e.g., hydrogen sulfide, sulfates, and phosphates). Typically such high BOD and COD wastes would require the supply of additional oxygen at levels above those typically required for maintaining microbial growth in order to fulfill the BOD and/or COD requirements without harming the microbial growth within the aerator 140 or causing an oxygen depleted environment within the aerator 140. At least some of the substances causing the elevated BOD and COD levels may physically or chemically bond to the biological growth material 106, reducing the concentration of such wastes in the fluid. Additionally, at least some of the substances causing the elevated BOD and COD levels are physiologically consumed by the microbial population carried by the biological growth media 106. Thus, the fluid 112 exiting the aerator 140 includes at least some of the one or more substances (i.e., BOD and COD) at a second concentration that is lower than the first concentration.

The use of the biological growth media such as PNLM provides additional benefits in managing the biosludge in the aerator 140. In addition to providing a growth surface that physically and physiologically supports microbial growth, the growth media also absorbs, via physical binding or chemical bonding, at least some of the substances present in the fluid 102. In at least some instances, the addition of biological growth media 106 to the treatment process improves biosludge settleability in subsequent treatment steps, thereby advantageously decreasing the size of downstream equipment such as clarifiers and/or sludge separators. In at least some instances, the addition of the biological growth media 106 to a treatment process can further create conditions within the aerator and subsequent sludge separators that disfavor the excessive growth of filamentous fungi and bacteria, such as *Nocardia*, and *Sphaerotilus Natans* that tend to hinder the settleability of the sludge.

Biosludge volume in the aerator 140 increases continuously as the result of microbial growth in the biosludge contained in the aerator 140. In many instances, maintaining a desired sludge age in the aerator 140 requires exhausting at least a portion of the biosludge 116 from the aerator 140 on a continuous or intermittent basis. The biosludge 116 exhausted from the aerator 140 contains both microbial growth and the biological support media 106. A portion of the biosludge 116 removed from the aerator 140 is recycled on a continuous or intermittent basis as biosludge 108 for introduction as an inoculum to establish microbial growth in the growth support media 106 introduced to the contactor 120. The remaining portion of the biosludge 116 flows to the separator 160.

The separator 160 separates the biosludge 116 into three primary components, a first portion of the fluid may be separated and removed from the biosludge 116 in a liquid-solid separation stage 170. The remaining, thickened, biosludge is then separated in a solid-solid separation stage 180 into a second portion consisting of a biological growth media-rich separated biological growth media component 142 and a third portion consisting of a microbial growth-rich biological component 144 that includes microbial growth removed or otherwise separated from the biological growth media component 142. At least a portion of the biological growth media-rich separated biological growth media component 142 is recycled to the contactor 120 for reintroduction to the aerator 140. At least a portion of the biological microbial growth-rich biological component 144 is available for subsequent post-processing (e.g., dewatering and/or disposal).

Figure 2:
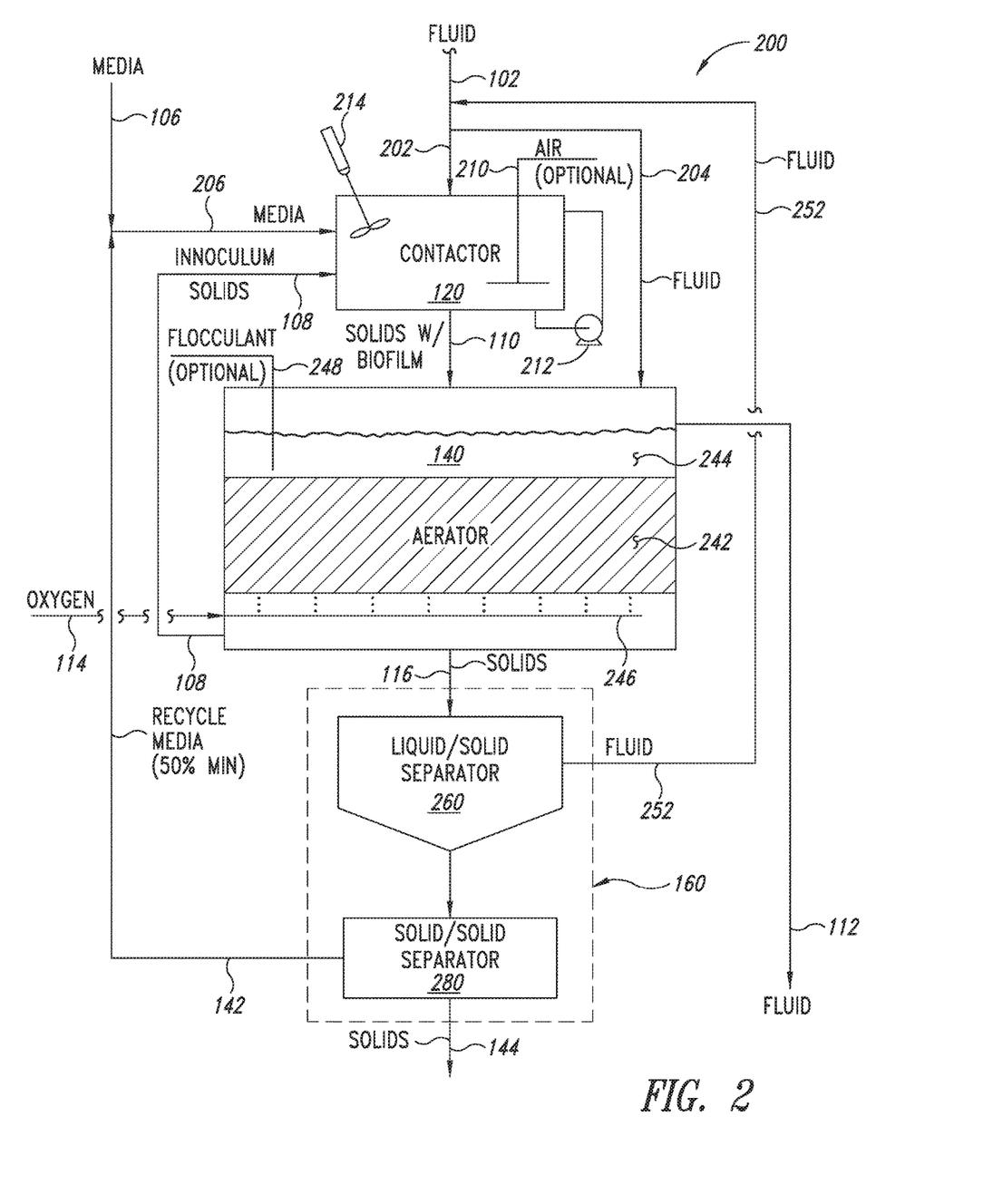
FIG. 2 is a schematic diagram of an illustrative treatment system for reducing the concentration of one or more substances in a fluid using a powdered natural lignocellulosic material (PNLM) that enhances the treatment process and which is separated from a biosludge and recycled back to the treatment process, according to one non-limiting illustrated embodiment.

FIG. 2 shows an example treatment system 200 for a fluid 102 containing one or more substances at a first concentration, according to one or more embodiments. In at least some implementations, the fluid 102 is an aqueous stream containing primarily municipal, commercial, industrial, or institutional wastewater. Such wastewater may include municipal waste in the form of sewage and other household wastes; commercial waste in the form of food processing, farming, or similar wastes; industrial waste in the form of chemical contaminants, fats, oils, and greases; or institutional waste in the form of a combination of sewage and other wastes generated by institutions such as schools, hospitals, and similar public facilities.

The first concentration of substances found in a given wastewater may vary widely dependent primarily upon the source. A typical municipal wastewater 102 may include some or all of the following substances in the following concentrations: total solids of about 1500 milligrams per liter (mg/l) or less; total dissolved solids of about 1000 mg/l or less; suspended solids of 500 mg/l or less; nitrogen (as N) of about 100 mg/l or less; phosphorus (as P) of about 50 mg/l or less; chloride of about 125 mg/l or less; alkalinity (as $CaCO_3$) of about 250 mg/l or less; oil and grease of about 200 mg/l or less; and $BOD_5$ (the biochemical oxygen demand at 20° C. over 5 days—a measure of the biodegradable organic matter in the wastewater) of about 500 mg/l or less.

Industrial wastewater composition also varies widely by industry and type of primary treatment. A refinery wastewater 102 typically contains hydrocarbons which may increase both the chemical oxygen demand and the biological oxygen demand of the wastewater. For example, an illustrative refinery waste may include a fluid such as water containing one or more substances such as free hydrocarbons of about 1000 mg/l or less; suspended solids of about 500 mg/l or less; dissolved solids of about 700 mg/l or less; sulfides (as S) of about 150 mg/l or less; ammonia of about 150 mg/l or less. Such a refinery wastewater may have a chemical oxygen demand ("COD") of about 1500 mg/l or less and a biological oxygen demand of about 600 mg/l or less. Hydrocarbon substances can include alkanes, alkenes, cyclical compounds, and aromatics.

In another example, an illustrative poultry processing wastewater may include a fluid such as water containing one or more substances such as total suspended solids of about 500 mg/l or less; fats/oil/grease ("FOG") of about 700 mg/l or less; total Kjeldahl nitrogen ("TKN") of about 1,000 mg/l or less; and total phosphorous of about 100 mg/l or less. Such a poultry processing wastewater may have a $BOD_5$ of about 2,500 mg/l or less; and COD of about 3,500 mg/l or less.

The incoming fluid 102 may be apportioned into two portions, a first, generally lesser, fluid portion 202 is introduced to the contactor 120 via one or more inlet connections. A second, generally greater, fluid portion 204 is introduced to the aerator 140 via one or more inlet connections. The contactor 120 provides the system 200 the ability to promote microbial biofilm growth and development in the presence of the biological growth media prior to introduction to the aerator 140. The temperature, pH, and concentration of contaminants and, where necessary, nutrients are maintained in the contactor 120 in a range favorable for the growth and development of the microbial biofilm. The presence of the biological growth media 106 in the contactor 120 provides a large quantity of surface area for microbial growth and attachment of the microbial biofilm.

The contactor 120 receives the biological growth media 206 either in dry form or as slurry (e.g., as biological growth media dispersed in water). In some instances, the biological growth media-rich separated biological growth media component 142, and new biological growth media 106 may be combined in whole or in part to provide the biological growth media 206 delivered to the contactor 120. In some instances, the biological growth media-rich separated biological growth media component 142 may be added separate from all or a portion of the new biological growth media 106. The combined biological growth media component 142 and new biological growth media 106 are added at rates sufficient to maintain a desired concentration of biological growth media within the contactor 120. The concentration of biological growth media in the contactor 120 can be maintained at about 10,000 parts per million (ppm) or less; about 5,000 ppm or less; about 4,000 ppm or less; about 3,000 ppm or less; about 2,000 ppm or less; about 1,000 ppm or less; or about 500 ppm or less. The biological growth media 106 can include one or more powdered natural lignocellulosic materials (PNLMs). In one or more instances, the biological growth media 106 can include powdered kenaf (*Hibiscus cannabinus*, a plant in the Malvaceae family).

Although not shown in FIG. 2, those of skill in the treatment arts will appreciate that additional materials may be added to the contactor 120 to maintain conditions favorable for microbial growth. For example, a pH control system may be coupled to the contactor 120 to maintain the pH of the contactor contents within a defined range (e.g., 6.5 to 8.0). Also a nutrient feed system may be coupled to the contactor 120 to maintain a defined concentration of one or more preferred nutrients (e.g., methanol) that are favorable for microbial growth in the contactor 120.

The contactor 120 can include any number of devices, components, systems, or combinations thereof that promote the mixing of the fluid portion 202, the biological growth media 206, and the biosludge 108 recycled from the aerator 140. In at least some instances, the contactor 120 can include any number of agitated vessels. In at least some instances, the contactor 120 may include one or more temperature controlled vessels, for example one or more jacketed vessels or one or more vessels equipped with internal heating/cooling coils through which a thermal transfer media is circulated. The temperature of the contents in the contactor 120 may be maintained at a temperature of from about 5° C. to about 45°; about 10° C. to about 40°; about 10° C. to about 35°; about 10° C. to about 30°; about 15° C. to about 30°; or about 15° C. to about 25°. In some instances, the contactor 120 may be equipped with drags or scrapers to assist or otherwise induce the flow of the accumulated acclimated biomass and biological growth media 106 from the contactor 120. In some instances, the contactor 120 may include one or more subsurface lagoons or similar structures. In some instances, more than one contactor 120 may be used, for example a number of contactors 120 may be serially sequenced. In another instance, more than one contactor 120 may be arranged in parallel to provide a number of different acclimated microbial growths for addition to the aerator 140.

The volume of the contactor 120 is determined at least in part on the desired retention time of the fluid 202, biological growth media 206, and recycled biosludge 108. The desired retention time in the contactor may be based at least in part on the time required to develop a defined quantity of microbial biofilm on the biological growth media and to acclimate the microbial biofilm to the substances present in the fluid 202. The contactor 120 may include one or more vessels or similar containment structures sized to contain the fluid 202, biological growth media 206, and recycled biosludge 108 for a minimum time of at least about 4 hours; at least about 12 hours; at least about 24 hours; at least about 48 hours; at least about 72 hours; at least about 96 hours; or at least about 144 hours.

In some instances, the contactor 120 may remain in an aerobic state at all times. The contactor 120 may include one or more aerators 210 to maintain a defined level of dissolved oxygen in the contactor 120. The aerator 210 can maintain a dissolved oxygen level in the contactor 120 of about 0.1 ppm or more; about 0.5 ppm or more; about 1 ppm or more; about 2 ppm or more; or about 5 ppm or more. In some instances, the contactor 120 may cycle or may be alternated between aerobic conditions and anaerobic or anoxic conditions.

In some instances, the contactor 120 may include one or more devices or systems to promote a uniform or near uniform distribution of fluid 202, biological growth media 206, and recycled biosludge 108 in all or a portion of the contactor 120. In at least some instances, one or more pumps 212 or similar fluid circulators may be used to periodically, intermittently, or continuously remove at least a portion of the contents of the contactor 120 and reintroduce the removed contents at a different point in the contactor 120. In other instances, one or more agitators or fluid mixers 214 may be used to periodically, intermittently, or continuously circulate the contents of the contactor 120. Biological growth media that includes acclimated microbial biofilm 110 is exhausted from the contactor 120 and introduced to the aerator 140.

The aerator 140 can include any number of components, devices, systems or combinations thereof suitable for maintaining a biosludge that includes the biological growth media and microbial growth in a fluid that includes one or more substances at a first concentration under aerobic conditions. In at least some instances, the aerator 140 may include a fixed film type aerator in which an oxygen containing gas 114 is supplied via one or more distribution and/or diffusion structures 246. In at least some instances, the oxygen containing gas 114 is supplied periodically, intermittently, or continuously to maintain the biological growth media and microbial growth in suspension within the aerator 140. In at least some instances, the aerator 140 may be maintained in an aerobic state in which the dissolved oxygen level is maintained in a defined range at least a portion of the time. In some instances, the oxygen containing gas 114 is supplied to the distribution or diffusion structure to maintain the dissolved oxygen level in the aerator 140 at a level of about 0.5 ppm or more; about 1 ppm or more; about 2 ppm or more; about 3 ppm or more; about 4 ppm or more; or about 5 ppm or more. In at least some instances, the aerator 140 may be maintained intermittently, periodically, or continuously in an anoxic or anaerobic condition where the dissolved oxygen level in the aerator is maintained below about 2 ppm; below about 1 ppm; below about 0.5 ppm; or below about 0.1 ppm. Where the aerator 140 is maintained at times in an aerobic state and an anoxic or anaerobic state, the ratio of the time spent in aerobic conditions to the time spent in anoxic or anerobic conditions can be about 1:1 or less; about 2:1 or less; about 3:1 or less; or about 5:1 or less.

The intimate contact between the fluid and the biological growth media and microbial growth present in the aerator 140 reduces the concentration of some or all of the one or more substances in the fluid from the first concentration to a second, lower, concentration. In at least some instances, at least a portion of the one or more substances present in the fluid physically bind and/or chemically bond with the biological growth media 206 in the aerator 140. In at least some instances, the microbial growth in the aerator 140 physiologically consume at least a portion of the one or more substances present in the fluid 102. Thus, the biological growth media 206 and the microbial growth in the aerator 140 synergistically combine to reduce the concentration of the one or more substances present in the fluid to a second concentration that is lower than either the biological growth media or the microbial growth alone could achieve.

In some instances, the suspended biological growth media and microbial growth may be permitted to intermittently, periodically, or continuously settle within the aerator 140 to provide a biosludge blanket 242 containing settled biological growth media 206 and biomass and a fluid-rich layer 244 containing primarily clarified fluid. In at least some instances, a portion of the fluid-rich layer 244 may be removed from the aerator 140 to provide a fluid-rich effluent 112. In the fluid-rich layer 244 and the fluid-rich effluent 112, at least some of the one or more substances are at a second concentration that is lower than the first concentration of substances in the fluid 102.

For example, the fluid 102 may include a refinery wastewater effluent and the substances include one or more hydrocarbons at a first concentration of about 50 ppm or more; about 100 ppm or more; about 200 ppm or more; about 300 ppm or more; about 400 ppm or more; about 500 ppm or more; or about 1000 ppm or more. In such an example, the fluid-rich effluent 112 may include water in which the one or more hydrocarbons having a second concentration of about 400 ppm or less; about 300 ppm or less; about 200 ppm or less; about 100 ppm or less; about 50 ppm or less; about 25 ppm or less; about 10 ppm or less; about 5 ppm or less; or about 1 ppm or less.

In another example, the fluid 102 can include a poultry processing wastewater effluent and the substances include FOG at a concentration of about 100 ppm or more; about 200 ppm or more; about 300 ppm or more; about 400 ppm or more; or about 500 ppm or more; $BOD_5$ of about 500 ppm or more; about 1000 ppm or more; about 1500 ppm or more; or about 2000 ppm or more; COD of about 500 ppm or more; about 1000 ppm or more; about 1500 ppm or more; or about 2000 ppm or more; and a TKN of about 100 ppm or more; about 300 ppm or more; about 500 ppm or more; or about 700 ppm or more. In such an example, the fluid-rich effluent 112 may include water in which the FOG concentration is less than about 400 ppm; less than about 300 ppm; less than about 200 ppm; less than about 100 ppm; less than about 50 ppm; or less than about 10 ppm; $BOD_5$ of less than about 1000 ppm; less than about 500 ppm; less than about 200 ppm; less than about 100 ppm; less than about 50 ppm; or less than about 10 ppm; COD of less than about 2000 ppm; less than about 1000 ppm; less than about 500 ppm; less than about 500 ppm; less than about 100 ppm; or less than about 50 ppm; and a TKN of less than about 500 ppm; less than about 300 ppm; less than about 200 ppm; less than about 100 ppm; less than about 50 ppm; or less than about 10 ppm.

The ability of the aerator 140 to reduce the concentration of the one or more substances present in the fluid 102 is based at least in part on the residence time of the biosludge (or the sludge age) in the aerator 140. In at least some instances, the sludge age, i.e., the mixed liquor suspended solids ("MLSS") divided by the mass of new biosludge 242 produced each day by the aerator 140, in the aerator 140 can be about 30 days or less; about 25 days or less; about 20 days or less; about 15 days or less; about 10 days or less; about 5 days or less; or about 2 days or less. The performance of the aerator 140 is dependent at least in part on the MLSS present in the aerator 140 and the resultant food-to-mass ("F/M") ratio of the substances in the fluid 102. In at least some instances, the F/M ratio in the aerator is maintained below about 0.5 kg BOD/Kg MLSS/day; below about 0.4 kg BOD/Kg MLSS/day; below about 0.3 kg BOD/Kg MLSS/day; below about 0.2 kg BOD/Kg MLSS/day; below about 0.1 kg BOD/Kg MLSS/day; below about 0.05 kg BOD/Kg MLSS/day; or below about 0.01 kg BOD/Kg MLSS/day.

In at least some instances, one or more flocculants 248 may be optionally introduced to the aerator 140. Such flocculants may include, but are not limited one or more organic polymers, ferric chloride, or alum.

The aerator 140 can include an above ground structure such as a vertical straight wall vessel having a diameter sufficient to accommodate a defined rise rate or upflow velocity. In at least some instances, the upflow velocity in the aerator can be about 0.1 meters per hour (m/h) or more; about 0.25 m/h or more; about 0.5 m/h or more; about 1 m/h or more; about 2 m/h or more; or about 3 m/h or more. Advantageously, the use of biological growth media tends to result in denser sludge that settles more quickly in the aerator, thereby permitting the use of higher rise rates and consequently permitting the use of smaller aerators for an equivalent hydraulic loading. The biosludge in the aerator 140 will increase in mass due to microbial growth. To maintain a defined volume of biosludge in the aerator 140, intermittently, periodically, or continuously biosludge 116 is removed from the aerator 140 and introduced to the separator 160. The solids content of the biosludge 116 exhausted from the aerator 140 can be about 2 weight percent (wt %) solids or more; about 5 wt % solids or more; about 7 wt % solids or more; about 10 wt % solids or more; about 12 wt % solids or more; or about 15 wt % solids or more. In at least some instances, the aerator 140 can have a conical bottom to facilitate the flow of the biosludge 116 from the aerator 140.

The separator 160 can include any components, devices, systems, or combinations thereof capable of separating the biological growth media from the biosludge 116 exhausted from the aerator 140. In at least some implementations, the biosludge 116 is separated to provide a fluid-rich fluid 252, a microbial growth-rich biological component 144 and a biological growth media 142 in a single stage. In other implementations, the biosludge 116 is separated to provide a fluid-rich fluid 252, a microbial growth-rich biological component 144 and a biological growth media 142 in two stages, a first liquid/solid separation stage 260 and a second solid/solid separation stage 280.

The liquid/solid separation stage 260 thickens the biosludge 116 by removing at least a portion of the fluid from the biosludge 116. The liquid/solid separation stage 260 can include one or more gravity settlers, centrifugal separators, hydrocyclones, inclined plate separators, or combinations thereof. In at least some instances the liquid solid separation stage 260 separates the incoming biosludge 116 into a fluid-rich fluid 252 and a thickened biosludge. In some instances, at least a portion of the fluid-rich fluid 252 can be recycled to the contactor 129. In other instances, at least a portion of the fluid-rich fluid 252 can be directed to an external treatment process not shown in FIG. 2. In at least some implementations, the liquid/solid separation stage 260 can separate at least a portion of the microbial growth from the biological support media during the liquid/solid separation process.

The fluid-rich fluid 252 exhausted from the separator 160 can have a solids content of about 15 wt % or less; about 12 wt % or less; about 10 wt % or less; about 8 wt % or less; about 4 wt % or less; about 2 wt % or less; about 1 wt % or less; or about 0.5 wt % or less. The thickened biosludge produced by the liquid/solid separation stage 260 can have a solids content of about 4 weight percent (wt %) solids or more; about 10 wt % solids or more; about 14 wt % solids or more; about 20 wt % solids or more; about 24 wt % solids or more; or about 30 wt % solids or more.

The thickened biosludge is exhausted to the solid/solid separation stage 280. The solid/solid separation stage 280 can separate at least a portion of the microbial growth from the biological support media during the solid/solid separation process. The solid/solid separation stage 280 can include one or more filters, screens, or other separation devices capable of separating at least a portion of the biological support media from the microbial growth to provide the biological growth media 142 and the microbial growth-rich biological component 144. At least a portion of the biological growth media 142 is recycled to provide at least a portion of the biological growth media in the contactor 120.

The biological growth media 142 exhausted from the separator 160 can include both biological growth media and microbial growth. The solids (i.e., both the biological growth media and microbial growth) content of the biological growth media 142 exhausted from the separator 160 can be about 30 wt % or more; about 40 wt % or more; about 50 wt % or more; about 60 wt % or more; about 65 wt % or more; about 70 wt % or more; or about 75 wt % or more. The biological growth media 142 can have a b iological growth media content of about content of about 40 wt % or more (dry basis); about 50 wt % or more; about 55 wt % or more; about 60 wt % or more; about 65 wt % or more; or about 70 wt % or more. The microbial growth 144 exhausted from the separator 160 can have a microbial growth content of about 35 wt % or more; about 40 wt % or more; about 45 wt % or more; about 50 wt % or more; about 55 wt % or more; or about 60 wt % or more.

Figure 3:
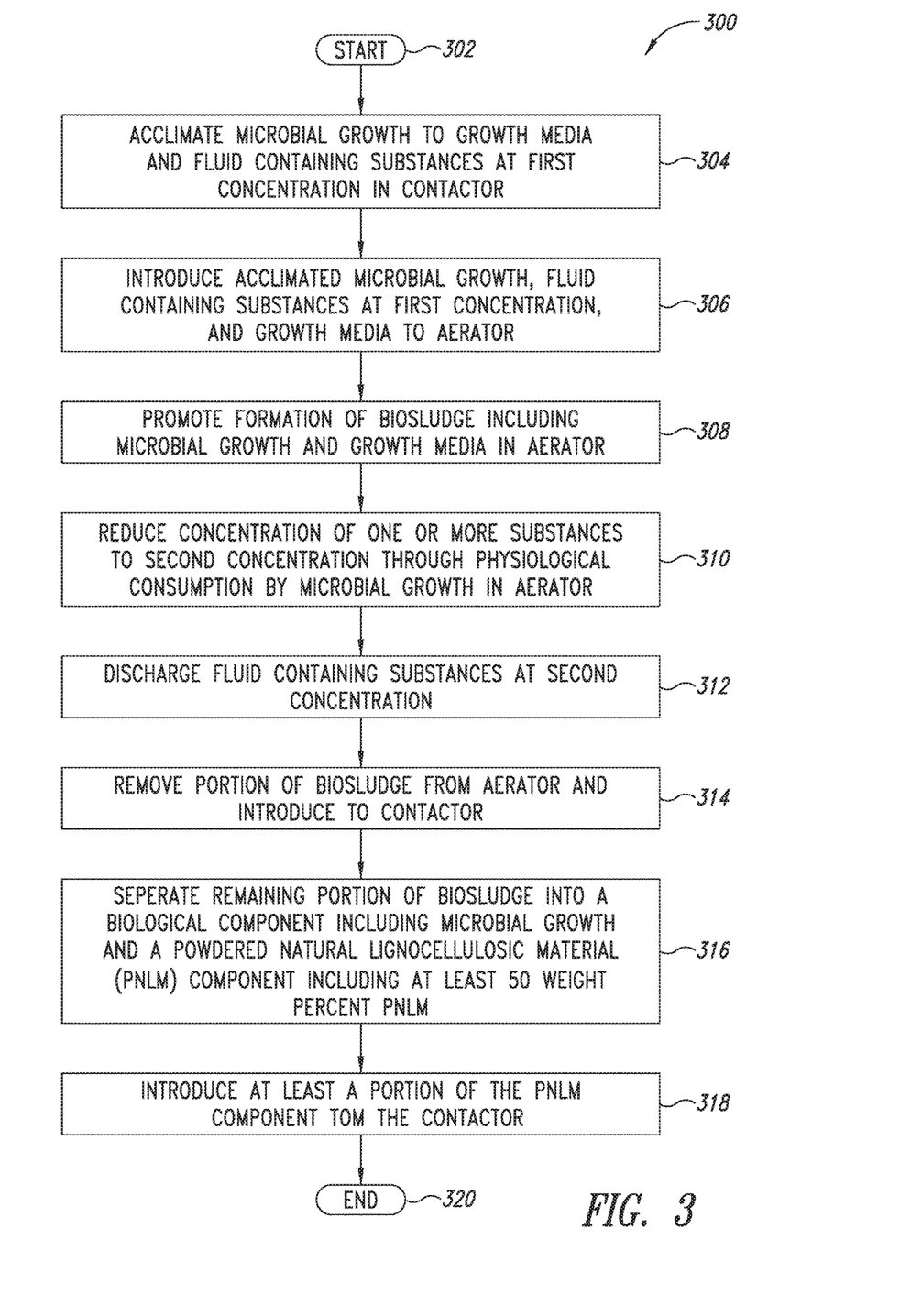
FIG. 3 is a flow diagram of an illustrative method for reducing the concentration of one or more substances in a fluid using a powdered natural lignocellulosic material (PNLM) to enhance the treatment process and which is separated from a biosludge and recycled back to the treatment process, according to one non-limiting illustrated embodiment.

FIG. 3 shows an illustrative treatment method for reducing the concentration of one or more substances in a fluid from a first concentration to a second, lower, concentration via an activated sludge treatment process using microbial growth on a biological growth substrate comprising a powdered natural lignocellulosic material ("PNLM"), according to one or more embodiments. In at least some instances, the treatment process includes one or more contactors 120, one or more aerators 140, and one or more separators 160 as described in detail above. The treatment method commences at 302.

At 304, a PNLM biological growth media 106 that may include kenaf in whole or in part combines in the contactor 120 with an inoculum that includes biosludge removed from the aerator 140, and at least a portion 202 of the incoming fluid 102 containing one or more substances at a first concentration. In at least some instances, at least a portion of the PNLM biological growth media may include biological growth media separated in the one or more separators 160, for example in the one or more solid/solid separators 280. In at least some instances, at least a portion 252 of the fluid in the contactor 120 may include the fluid-rich fluid separated in the one or more separators 160, for example in the one or more liquid/solid separators 260.

The residence time of the mixture 110 of biological growth media, microbial growth, and fluid in the one or more contactors 120 may be determined at least in part based on the time to establish a biofilm on the biological growth media by the microbial growth inoculum. The residence time of the mixture of biological growth media, microbial growth, and fluid in the one or more contactors 120 may be determined at least in part based on the time to acclimate the biofilm to at least some of the one or more substances in the fluid 202. Such residence time may be as little as several hours to as much as several days.

The conditions (temperature, pH, nutrients, etc.) within the one or more contactors 120 are maintained within defined ranges that are beneficial for the establishment of the acclimated biofilm on the PNLM biological growth media. The one or more contactors 120 are operated under aerobic conditions, anoxic conditions, anaerobic conditions, or some combination thereof.

At 306, all or a portion of the mixture 110 containing the acclimated, established microbial growth, PNLM biological growth media, and fluid in the one or more contactors 120 is introduced to the one or more aerators 140. The mixture 110 can be introduced to the one or more aerators 140 intermittently, periodically, or continuously. In addition to the mixture 110 from the one or more contactors 120, the remaining fluid 204 including one or more substances at a first concentration is also introduced to the one or more aerators 140. In addition to the mixture 110 and the remaining portion of the fluid 204, one or more flocculants 248 may be optionally added to the one or more aerators 140. In addition to the mixture 110 and the remaining portion of fluid 204, one or more nutrients may be optionally added to the one or more aerators 140.

At 308, conditions favoring or otherwise promoting the formation of a biosludge 242 that includes the PNLM biological growth media and the microbial growth are maintained in the one or more aerators 140. An oxygen containing gas 114, such as air, is added to the one or more aerators 140 via one or more diffusers or distributors 246 to create an aerobic condition within the one or more aerators 140. In at least some instances, the one or more aerators 140 are under aerobic conditions, anoxic conditions, anaerobic conditions, or some combination thereof. The PNLM biological growth media and the microbial growth are suspended in the aerator 140 as least in part by the passage of the oxygen containing gas 114 through the biosludge. The passage of the oxygen containing gas 114 through the biosludge also advantageously reduces the formation of anoxic or anaerobic "dead zones" or stagnant areas within the biosludge 242.

At 310, the concentration of the one or more substances present in the fluid 102 is reduced by the physiological uptake of at least some of the one or more substances by the microbes present in the biosludge 242. A fluid portion 244 that includes at least some of the one or more substances at a second, lower, concentration thus forms in the one or more aerators 140.

At 312, to maintain a defined operating level in the at least one aerator 140, at least a portion of the fluid 244 is intermittently, periodically, or continuously exhausted from the one or more aerators 140 as fluid 112. For example, a municipal waste may include a fluid such as water and one or more substances such as FOG and nitrogen at a first concentration. Within the one or more aerators 140, physical binding or chemical bonding to the PNLM biological growth media removes at least a portion of the FOG and nitrogen. Additionally, the microbial growth present in the one or more aerators 140 consumes at least a portion of the FOG and nitrogen. Therefore, the second concentration of the substances (i.e., FOG and nitrogen) in the fluid 112 exhausted from the one or more aerators 140 is lower than the first concentration of the substances in the incoming fluid 102.

In another example, a food processing waste may include a fluid such as water and one or more substances such as TKN and FOG at a first concentration. Within the one or more aerators 140, physical binding or chemical bonding to the PNLM biological growth media may remove at least a portion of the TKN and FOG. Additionally, at least a portion of the TKN and FOG may be consumed by the microbial growth present in the one or more aerators 140. Therefore, the second concentration of the substances (i.e., TKN and FOG) in the fluid 112 exhausted from the one or more aerators 140 is lower than the first concentration of the substances in the incoming fluid 102.

In yet another example, a refinery waste may include a fluid such as water and one or more substances such as short chain and aromatic hydrocarbons at a first concentration. Within the one or more aerators 140, physical binding or chemical bonding to the PNLM biological growth media may remove at least a portion of the short chain and aromatic hydrocarbons. Additionally, at least portion of the short chain and aromatic hydrocarbons may be consumed by the microbial growth present in the one or more aerators 140. Therefore, the second concentration of the substances (i.e., short chain and aromatic hydrocarbons) in the fluid 112 exhausted from the one or more aerators 140 is lower than the first concentration of the substances in the incoming fluid 102.

At 314, at least a portion 108 of the biosludge 242 in the one or more aerators 140 is exhausted on an intermittent, periodic, or continuous basis from the one or more aerators 140 to the one or more contactors 120 to provide the inoculum in the one or more contactors 120. The biosludge 108 includes both PNLM biological growth media and microbial growth.

At 316, to maintain a defined sludge age and/or biosludge level in the at least one aerator 140, at least a portion of the biosludge 242 is intermittently, periodically, or continuously exhausted as biosludge 116 from the one or more aerators 140 to the one or more separators 160. The biosludge 116 includes both PNLM biological growth media and microbial growth. In the one or more separators 160, at least a portion of the PNLM biological growth media is separated from the biosludge 116 to provide a PNLM biological growth media component that includes at least 50 weight percent (dry solids basis) PNLM biological growth media. In at least some instances, e.g., at 318, all or a portion of the separated PNLM biological growth media component 142 is exhausted to the one or more contactors to meet at least a portion of the PNLM biological growth media demand in the one or more contactors 120. The treatment method concludes at 320.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to: Provisional U.S. Patent Application Ser. No. 61/894,232 filed Oct. 22, 2013; U.S. Patent Application Publication No. 2007/0170115, filed Jan. 20, 2006 and published Jul. 26, 2007; U.S. Patent Application Publication No. 2011/0281321, filed May 11, 2011 and published Nov. 17, 2011; U.S. Patent Application Publication No. 2011/0272350 filed May 7, 2010 and published Nov. 10, 2011; and U.S. Patent Application Publication No. 2013/0233792 filed Mar. 12, 2012 and published Sep. 12, 2013 are incorporated herein by reference, in their entirety. Aspects of the embodiments can be modified, if necessary, to employ processes, equipment, biological growth media, and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system to treat a fluid including one or more substances at a first concentration, the system comprising:
   (a) an aerator including:
      (i) at least one inlet connection to receive a portion of the fluid containing the one or more substances at the first concentration;
      (ii) at least one inlet connection to receive a mixture that includes a portion of the fluid containing the one or more substances at the first concentration, a biological growth media and a microbial growth;
      (iii) at least one inlet connection to receive an oxygen containing gas;
      (iv) at least one gas dispersion system to disperse the oxygen containing gas into the mixture to aerobically stimulate the formation of biosludge that includes at least microbial growth and biological growth media through the physiological consumption of at least a portion of the one or more substances by at least a portion of the microbial growth within the aerator;
      (v) at least one outlet connection to exhaust at least a portion of the fluid including some or all of the one or more substances at a second concentration, the second concentration being less than the first concentration; and
      (vi) at least one outlet connection to exhaust a first portion of a biosludge blanket formed in the aerator, the first portion of the biosludge blanket being returned to the aerator via the at least one inlet connection to receive a mixture that includes a portion of the fluid containing the one or more substances at the first concentration, a biological growth media and a microbial growth; and
   (b) a separator to apportion a remaining portion of the biosludge blanket formed in the aerator into a separated biological growth media-rich component comprising a biological component and at least 60 wt % biological growth media, the separator including:
      (i) at least one inlet connection fluidly coupled to the aerator to receive the remaining portion of the biosludge blanket exhausted by the aerator;
      (ii) at least one liquid/solid separations stage to apportion the remaining portion of the biosludge blanket into a fluid-rich portion and a biosludge-rich portion;
      (iii) at least one solid/solid separations stage to apportion at least some of the biosludge-rich portion into the separated biological growth media-rich component and a microbial growth-rich biological component;
      (iv) at least one discharge connection to exhaust the portion of the fluid-rich portion to the aerator;
      (v) at least one discharge connection to exhaust the microbial growth-rich biological component from the system; and
      (vi) at least one discharge connection to exhaust at least a portion of the separated biological growth media-rich component to the aerator.

2. The system of claim 1 wherein the biological growth media comprises a powdered natural lignocellulosic material (PNLM).

3. The system of claim 1 wherein the fluid comprises water and the one or more substances comprises one or more hydrocarbons.

4. The system of claim 3 wherein the one or more hydrocarbons include one or more of: a benzene compound, a toluene compound, an ethylbenzene compound, a xylene compound, and a phenolic compound.

5. The system of claim 1 wherein the one or more substances further comprise one or more of: ammonia and hydrogen sulfide.

6. The system of claim 1 wherein the fluid comprises water and the one or more substances comprises one or more quaternary amine compounds.

7. The system of claim 1 wherein the liquid/solid separation stage comprises at least one of: a gravity settling basin, a centrifugal separator, or a filter.

8. The system of claim 1 wherein the solid/solid separations stage comprises at least one of: one or more centrifuges, one or more hydrocyclones, and one or more drum separators.

9. A method of reducing the concentration of one or more substances present in a fluid from a first concentration to a second concentration that is lower than the first concentration, the method comprising:

introducing at least a portion of a microbial growth, the fluid containing one or more substances at the first concentration and a biological growth media to an aerator;

maintaining in the aerator a biological growth media concentration of from about 1 milligram of biological growth media per liter of fluid (mg/l) to about 5,000 mg/l;

maintaining in the aerator a dissolved oxygen concentration of from about 0.1 milligrams of oxygen per liter of fluid (mg/l) to about 5 mg/l by dispersing an oxygen containing gas into the fluid;

promoting the formation of a biological sludge that includes microbial growth and biological growth media in the aerator;

reducing the concentration of the one or more substances in the fluid from the first concentration to the second concentration through the physiological consumption of at least a portion of the one or more substances present in the fluid by at least a portion of the microbial growth in the aerator;

discharging from the aerator at least a portion of the fluid containing some or all of the substances at the second concentration;

forming a blanket of the biological sludge in the aerator;

removing a first portion of the blanket of the biological sludge from the aerator;

returning the first portion of the blanket of biological sludge to the aerator to provide at least a portion of the microbial growth in the aerator;

separating a remaining portion of the blanket of biological sludge into at least (1) a separated biological growth media-rich component comprising at least about 50% by weight separated biological growth media, (2) a microbial growth-rich biological component comprising microbial growth and (3) a fluid-rich portion;

introducing at least a portion of the fluid-rich portion to the aerator; and introducing at least a portion of the separated biological growth media-rich component to the aerator to provide at least a portion of the biological growth media.

10. The method of claim 9 further comprising contacting the microbial growth with an environment including the fluid containing one or more substances at a first concentration by combining under aerobic conditions at least a portion of the fluid containing the one or more substances at the first concentration with the biological growth media that includes one or more powdered natural lignocellulosic materials (PNLM) and the biological component that includes at least a portion of the microbial growth.

11. The method of claim 10 wherein combining at least a portion of the fluid containing the one or more substances at the first concentration with the biological growth media that includes one or more powdered natural lignocellulosic materials (PNLM) comprises:

combining at least a portion of the fluid containing the one or more substances at the first concentration with the biological growth media that includes kenaf.

12. The method of claim 9 further comprising contacting the microbial growth with an environment including the fluid containing one or more substances at a first concentration by contacting the microbial growth with an environment including the fluid comprising water containing one or more substances comprising one or more hydrocarbons at a first concentration at or above about 500 parts per million by weight (ppm).

13. The method of claim 9 further comprising contacting the microbial growth with an environment including the fluid containing one or more substances at a first concentration by contacting the microbial growth with an environment including the fluid comprising water containing one or more substances comprising at least one of an ammonia compound or a hydrogen sulfide compound at a first concentration at or above about 20 parts per million by weight (ppm).

14. The method of claim 9 further comprising contacting the microbial growth with an environment including the fluid containing one or more substances at a first concentration by contacting the microbial growth with an environment including the fluid comprising water containing one or more substances comprising a quaternary amine at a first concentration at or above about 50 parts per million by weight (ppm).

15. The method of claim 9 further comprising contacting the microbial growth with an environment including the fluid containing one or more substances at a first concentration to provide an acclimated microbial growth.

16. A system to treat a fluid including one or more substances at a first concentration, the system comprising:

(a) a contactor including:
  (i) at least one inlet connection to receive the fluid including the one or more substances at the first concentration;
  (ii) at least one inlet connection to receive a biological growth media;
  (iii) at least one inlet connection to receive a biological sludge that includes a microbial growth; and
  (iv) at least one outlet connection to exhaust a mixture that includes the fluid, the biological growth media and the microbial growth;

(b) an aerator including:
  (i) at least one inlet connection to receive a mixture that includes a portion of the fluid including the one or more substances at the first concentration, a biological growth media and a microbial growth;
  (ii) at least one inlet connection to receive an oxygen containing gas;
  (iii) at least one gas dispersion system to disperse the oxygen containing gas into the mixture to aerobically stimulate the formation of biosludge that includes at least microbial growth and biological growth media through the physiological consumption of at least a portion of the one or more substances by at least a portion of the microbial growth within the aerator; and
  (iv) at least one outlet connection to exhaust the mixture that includes a fluid, the biological growth media and the microbial growth, the fluid including some or all of the one or more substances at a second concentration, the second concentration being less than the first concentration; and (c) a separator to apportion into a biological component and a separated biological growth media-rich component comprising at least about 50% biological growth media, the mixture that includes the fluid, the biological growth media and the microbial growth, the fluid including some or all of the one or more substances at a second concentration, the second concentration being less than the first concentration, the separator including:
  (i) at least one liquid/solid separations stage including at least one inlet connection coupled to the aerator to receive the mixture exhausted by the aerator that includes the fluid, the biological growth media and the microbial growth, the fluid including some or all of the one or more substances at a second concentration, the second concentration being less than the first concentration, the at least one liquid/solid separations stage configured to apportion into a fluid-rich portion and a biosludge-rich portion, the mixture exhausted by the aerator that includes the fluid, the biological growth media and the microbial growth, the fluid including some or all of the one or more substances at a second concentration, the second concentration being less than the first concentration;

(ii) at least one solid/solid separations stage to apportion at least some of the biosludge-rich portion into the separated biological growth media-rich component and a microbial growth-rich biological component;

(iii) at least one discharge connection to exhaust the portion of the fluid-rich portion to the aerator;

(iv) at least one discharge connection to exhaust the microbial growth-rich biological component from the system; and (v) at least one discharge connection to exhaust at least a portion of the separated biological growth media-rich component to the aerator.

17. The system of claim 16 wherein the biological growth media comprises a powdered natural lignocellulosic material (PNLM).

18. The system of claim 16 wherein the contactor further comprises at least one surface solids removal system.

19. The system of claim 16 wherein the contactor further comprises at least one bottom solids removal system.

20. The system of claim 16 wherein the solid/solid separations stage comprises at least one of: one or more centrifuges, one or more hydrocyclones, or one or more drum separators.

* * * * *